United States Patent [19]
Levy

[11] Patent Number: 5,524,008
[45] Date of Patent: Jun. 4, 1996

[54] GENERATING REAL-TIME EVENTS IN A TDMA DIGITAL WIRELESS COMMUNICATIONS SYSTEM

[75] Inventor: Jonathan Levy, Kfar-Saba, Israel

[73] Assignee: National Semiconductor Corporation, Santa Clara, Calif.

[21] Appl. No.: 407,187

[22] Filed: Mar. 21, 1995

[51] Int. Cl.$^6$ ................................................. H04B 7/212
[52] U.S. Cl. ........................................... 370/95.3; 375/219
[58] Field of Search ..................................... 375/219, 222, 375/223; 326/37, 41, 47; 455/84, 34.1; 370/18, 29, 95.1, 95.3

[56] References Cited

U.S. PATENT DOCUMENTS

| | | | |
|---|---|---|---|
| 4,625,308 | 11/1986 | Kim et al. | 370/95.3 |
| 4,910,792 | 3/1990 | Takahata et al. | 455/52.2 |
| 5,259,003 | 11/1993 | Berger et al. | 375/260 |
| 5,321,690 | 6/1994 | Sato | 370/24 |

*Primary Examiner*—Benedict V. Safourek
*Attorney, Agent, or Firm*—Frishauf, Holtz, Goodman, Langer & Chick

[57] ABSTRACT

A technique for generating real-time events (control signal state changes) in a TDMA (Time Division Multiple Access) wireless digital communications system integrates the functions of a Burst Mode Controller (BMC) and a microcontroller onto a single chip, organizing them such that the BMC's "frame program" (defining time slot and bit times for real-time events) shares an instruction ROM with the microcontroller. An automatic DMA mechanism within the BMC retrieves event definitions from within the frame program and effects the real-time events defined therein at the appropriate time. The technique permits any combination of signals to be changed at any time, while simultaneously reducing overall chip area, microcontroller overhead, power-consumption and cost.

17 Claims, 3 Drawing Sheets

GENERATING REAL-TIME EVENTS IN A TDMA DIGITAL WIRELESS COMMUNICATIONS SYSTEM

TECHNICAL FIELD OF THE INVENTION

The invention relates to digital communications systems and, more particularly, to TDMA (Time Division Multiple Access) digital wireless communications systems.

BACKGROUND OF THE INVENTION

In digital wireless communications systems, it is often desirable for multiple (i.e., more than two) terminals to communicate with one another, all sharing a single frequency. One method of accomplishing this is commonly known as TDMA, or Time Division Multiple Access, whereby communications occur in a series of consecutive "frames". A frame is a prescribed block of time, (e.g., 10 milliseconds) during which each terminal is permitted to transmit and receive. All communications over the TDMA system are synchronized to the repetition rate of the series of frames. Each terminal is assigned one or more time-slots within a frame (a time slot is a portion of the duration of the frame) during which it may transmit or receive. Usually, a terminal is assigned at least two time slots: one time slot for transmitting and another time slot for receiving. Another time slot may be assigned to the terminal for energy measurement or for special signalling purposes. (Presumably, each terminal's time slot for transmitting is allocated to another terminal for receiving, and vice-versa). After the completion of one frame, another frame begins, such that frames occur sequentially in time, and such that during each frame, each terminal has an opportunity to transmit and receive short "bursts" of data during its assigned time slots. An exemplary time-sliced arrangement is shown in FIGS. 1A and 1B.

FIG. 1A depicts a time-line 100 having a generalized organization of frames and time slots for a TDMA wireless communication system. As a "previous" frame 110A (Frame N−1) ends, a "current" frame 110B (Frame N) commences. As the current frame 110B ends, a "next" frame 110C (Frame N+1) commences, etc. Within each frame 110A, 110B and 110C (of which the current frame 110B is representative), a plurality of shorter time slots (three being shown) are defined. In much the same sequential manner that frames follow one another in time, time slots follow one another in time (see time-line 110). For example, three time slots 120A (Slot M−1), 120B (Slot M) and 120C (Slot M+1) follow one another in time.

In order for a terminal to transmit, receive, make energy measurements or perform any other kind of signalling during a time slot, the terminal must control a wireless transceiver in a tightly synchronized manner. For example, in order to transmit during an assigned time slot, a terminal must wait for the assigned time slot to come along, then the terminal must enable its transceiver into a "transmit" mode, and must wait for the transmitter circuitry to settle (if any settling time is required). Next, the terminal must provide data to be transmitted at a transmit input to the transceiver. After transmitting the data (or at the end of the time-slot) the terminal must disable the transmit mode of the transceiver so that other terminals can communicate during their assigned time slots.

In order to communicate over a TDMA communication system, it is necessary that each terminal generate a set of frame- and time-slot synchronized real-time control signals for operating its transceiver and any other relevant communications-related apparatus. Examples of such real-time control signals might be: "enable transmitter power", "enable transmitter output", "disable receiver input", etc.

A TDMA system needs to effect operation of these control signals (e.g., "turn on the transmitter") to precise timing within a frame and a slot. This control is accomplished by activating and deactivating signals in a frame and time slot in a bit-time synchronous manner. Since actual signal timing requirements vary between different implementations of TDMA systems, the real-time control signal generation mechanism must allow for at least some flexibility in the timing definition.

FIG. 1B is a time-line 102 showing an expansion of time slot "M" 120B, during which two arbitrarily chosen, but representative, control signals 130 and 140 are operated by a terminal device. Time slot M is further subdivided into a number of smaller "bit times" 150. After the beginning of slot "M" 120B, a terminal waits until a first bit time t1 151 and asserts control signal 130. At a second bit time t2 152, the terminal asserts control signal 140, de-asserting it at a third bit time t3 153. At a fourth bit time t4 154, the terminal de-asserts the control signal 130. At a fifth bit time t5 155, the terminal asserts the control signal 140, de-asserting it at a sixth bit time t6 156.

The control signals 130 and 140 shown in FIG. 1B are merely representative of a wide variety of possible control signals, and are shown for purposes of illustration only. Actual control signals in a TDMA wireless communication system would depend upon terminal and transceiver configuration and upon exact frame, slot and bit time definitions for the specific TDMA wireless communication system of interest.

An example of a TDMA wireless system is known as the "DECT" system. In the exemplary DECT system, twelve full duplex communications channels share a single frequency by dividing the transmission time into "Frames", "Slots", and "Bits". A DECT frame is 10 milliseconds long; it is further divided into 24 equal time slots (slot 0 to slot 23). Each time slot is further divided into 420 Bit-times. Each Bit-time is the time required to transmit one bit of digital information.

Prior-art techniques for generation of real-time control signals in TDMA wireless communications systems include techniques utilized by Sitel (Sierra) and Philips, discussed in greater detail hereinbelow. In order to make the ensuing discussion of TDMA systems clear, the following conventions will be used:

A real-time "event" is a frame, slot and bit synchronized change of state of a control signal.

A "frame program" is a stored set of instructions for defining a set of real-time events.

An RF (Radio Frequency) Front-end contains circuitry that transmits and receives radio frequency (RF) signals.

A Burst Mode Controller (BMC) controls the timing of the RF Front-end and extracts digital data therefrom.

A Micro-controller contains a program that includes instructions for implementing high-level communications protocols and lower-level instructions for controlling a BMC.

The basic elements of interest in a TDMA system include:

1) an RF (Radio Frequency) Front-end (transceiver);

2) a Burst Mode Controller (BMC); and 3) a Micro-controller.

Sitel (Sierra) 14400/14401 BMC

Sitel's 14400 and 14401 Burst Mode Controllers contain a relatively large on-chip block of RAM (Random Access Memory) for storing "Frame Programs" that control the generation of real-time events to be generated. A separate (external) micro-controller prepares these programs and loads them to the BMC (e.g., into a RAM block) before the sequence of events is to begin. The Sitel devices also contain a "Sequencer" that interprets the commands in the frame programs and executes them, one instruction every bit-time. The instructions tell the BMC to set a signal, clear a signal, issue an interrupt, etc. In order to limit the size of each instruction (and thus limit the size of the RAM block), the instructions are limited to effecting only single events. In the Sitel system, the microcontroller controls a communication channel during a time slot by copying a frame program from the microcontroller's local memory to the BMC's internal RAM.

FIG. 2 is a block diagram of such a prior-art Sitel-type TDMA wireless communications terminal 200. A back-end processor (BEP) 202 communicates with an RF Front end 240 for effecting TDMA wireless digital communication (via an antenna 242) with other similar terminals. The BEP 202 includes a microcontroller 210, a BMC 220 and an ADPCM (Adaptive Delta Pulse Code Modulation) encoder/ decoder and codec 230. The ADPCM encoder/decoder and codec 230 connects to a speaker 232 and a microphone 234, e.g., as in a telephone handset. The microcontroller includes internal ROM (Read Only Memory) 212 and RAM (Random Access Memory) 214, and I/O Ports 216. The I/O ports 216 interface the microcontroller 210 to a display 217 and to a keyboard 218.

The BMC 220 (which is implemented as a discrete chip) includes an on-chip RAM 222 for storing a frame program. The frame program in the on-chip RAM 222 is interpreted by a complex sequence generator 224 to generate real-time events (e.g., transmitter control, interrupts, etc.). A Data interface (Data I/F) 226 in the BMC controls the exchange of transmitted and receive data with the RF Front End 240. The main drawbacks of such an approach are that it necessitates a large chip area for the BMC (220) due to the on-chip RAM and complex sequencer; and that flexibility in controlling events is significantly limited, since only one event (control signal state change) can be effected at a time.

Philips BMC

The Philips BMC uses a different method of generating real-time events. It contains a register for each of the events to be generated. The value stored in each register determines (within a limited range of bit times) the start and stop time of a respective event. The main drawbacks of this approach are: limited flexibility in controlling real-time events, since only a limited range of bit times can be specified for any given event; and the registers must be re-programmed for each active slot (i.e., transmit slot, receive slot, energy measurement slot, etc.).

BRIEF DESCRIPTION OF THE INVENTION

It is an object of the present invention to provide a technique for generating real-time events in a TDMA wireless communications system which minimizes the amount of chip area required for its implementation.

It is another object of the present invention to provide a technique for generating real-time events in a TDMA wireless communications system which provides greater flexibility than prior-art techniques.

It is a further object of the present invention to provide a technique for generating real-time events in a TDMA wireless communications system which permits multiple real-time events to be effected simultaneously.

It is a still further object of the present invention to provide a technique for generating real-time events in a TDMA wireless communications system which does not restrict the range of times during which a real-time event can occur.

According to the invention, the functions of a BMC and a microcontroller are integrated onto a single chip (semiconductor die) and are organized such that the BMC's "frame program" shares an instruction ROM with the microcontroller. A separate frame program is stored for each different type of time slot to be employed (e.g., transmit time slot, receive time slot, energy measurement time slot, etc.), since each type of time slot requires a different sequence of real-time events. An automatic mechanism within the BMC function retrieves event definitions from within the frame program and effects the real-time events defined therein at the appropriate time.

Further, according to the invention, each frame program "instruction" (the term "instruction" is used loosely here, since the inventive "frame program" differs from prior-art frame programs) includes an event mask for simultaneously controlling any combination of control signals which can be handled by the BMC.

The use of a ROM-based frame program rather than the prior-art technique of using a RAM-based frame program saves considerable chip area, since ROM cells typically are much smaller than RAM cells for a given amount of storage. Further, "sharing" of ROM between the BMC and microcontroller eliminates duplication of storage and excess decoding circuitry.

The architecture of the inventive integrated microcontroller/BMC differs from that of the prior-art in a variety of ways which will become evident in light of the following description thereof.

According to an aspect of the invention, an on-chip ROM contains a table of "RF Event" entries, in addition to the micro-controller's program and constant data. Each entry specifies both a "bit-time" and an associated "Event Mask". Each bit in the event mask corresponds to an control signal that must be triggered at the bit-time associated therewith.

According to another aspect of the invention, the RF event entries, since they share a ROM with the microcontroller's code, can be specified as a data structure appended to the microcontroller program.

According to another aspect of the invention, the integrated microcontroller/BMC includes an "Event Pointer" register that is programmed by the micro-controller to point to the beginning of a table in the on-chip ROM containing a list of events to occur in a time slot. An "Address Generator" is loaded with the value contained in the Event Pointer when the microcontroller/BMC is initialized. The Address Generator then retrieves successive ROM table entries by Direct Memory Access (DMA). For each DMA transfer from the ROM, a bit-time value is stored into a "Bit Register" and an Event Mask is stored into an "Event Register".

A "Slot Register" is programmed by the microcontroller with the number of a time slot in which the real-time events are to be generated. A "Bit Counter" keeps track of bit-times within a slot, and is incremented by a "Bit-clock". When the last bit in a time slot has been counted by the Bit Counter, an increment signal is provided to a "Slot Counter" and the Bit Counter starts counting over again from zero. The Slot Counter is cleared at the beginning of each frame and contains the number of the current slot.

A "Comparator" compares the values in the slot and the Bit registers with the values in the Slot and the Bit counters. When a match is found, a "match" signal is asserted. The match signal causes the contents of the event register to be transferred to an event latch and causes the Address Generator to fetch (via DMA—Direct Memory Access) the next ROM table entry, storing the bit time and event mask contained therein into the Bit register and Event Register, respectively. The output of the event register is the set of control signals for which events are generated.

For the system to utilize a time slot within a frame, the microcontroller loads the address of the first ROM table entry in the event list for the type of time slot into the event pointer, loads the time slot number into the "Slot Register", and enables event generation. From this point on, the microcontroller is not involved in the generation of real-time events for the time slot.

The present inventive technique eliminates the complexity associated with a frame program instruction sequencer. The DMA ROM table "transfers" utilized by the inventive technique employ small, simple digital techniques which are well known to those of ordinary skill in the art.

By incorporating a complete "event mask" into the ROM table entries for real-time events, it is possible to control many signals at the same time, since they are all stored into the event latch simultaneously, (By contrast, in the aforementioned Sitel approach, e.g., only one event can be activated at a time.) Further, the inventive technique permits any event to be generated at any time, providing maximum signal generation flexibility. (By contrast, in the aforementioned Philips approach, e.g., each event has a limited range of bit times during which it can be generated.)

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. Although the invention will be described in the context of these preferred embodiments, it should be understood that it is not intended to limit the spirit and scope of the invention to these particular embodiments.

DETAILED DESCRIPTION OF THE INVENTION

Figure 1A:
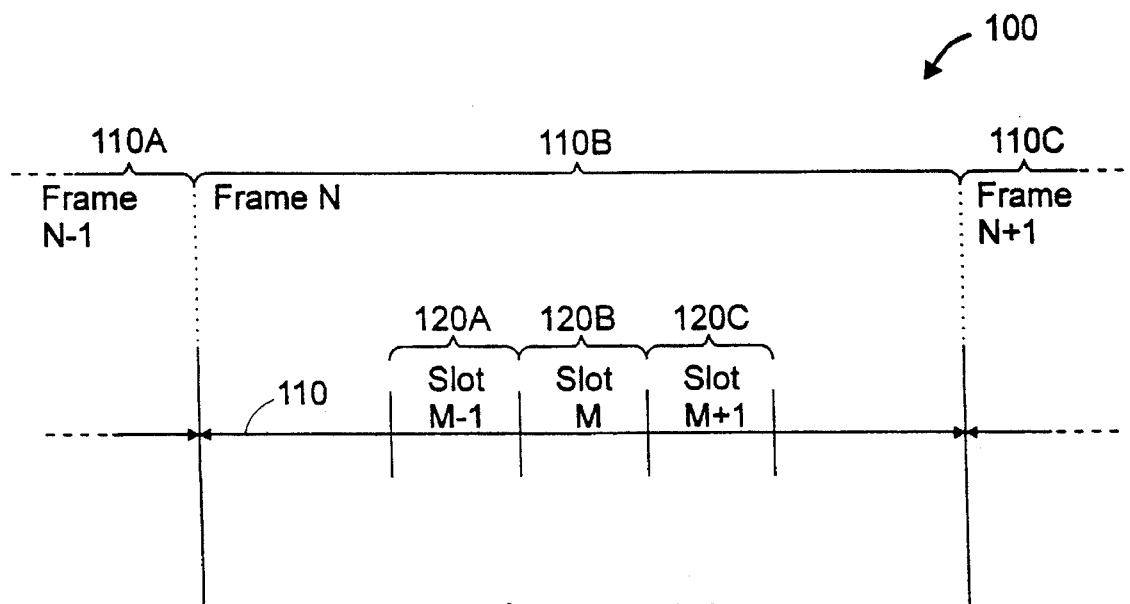
FIG. 1A is a time line diagram showing a generalized organization of frames for TDMA wireless communications systems.
Figure 1B:
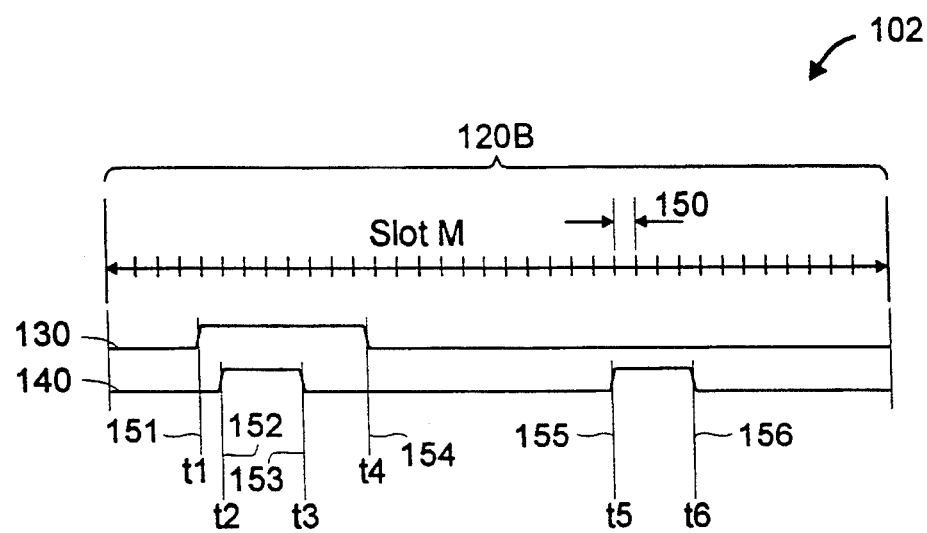
FIG. 1B is a time line diagram showing a generalized organization of a time slot within a frame for TDMA wireless communications.
Figure 2:
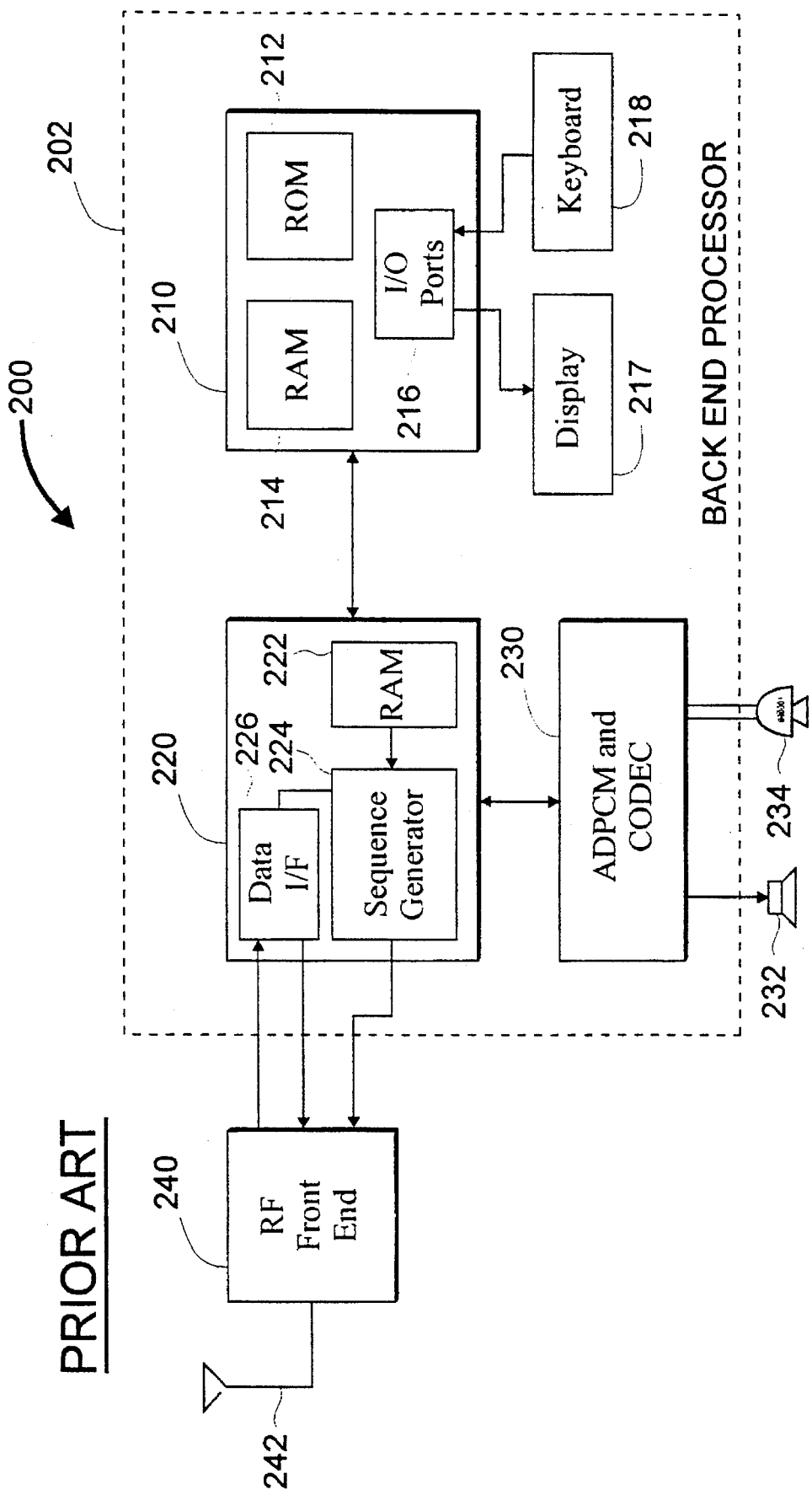
FIG. 2 is a block diagram of a prior-art technique for generating real-time events in a TDMA wireless communications system.
Figure 3:
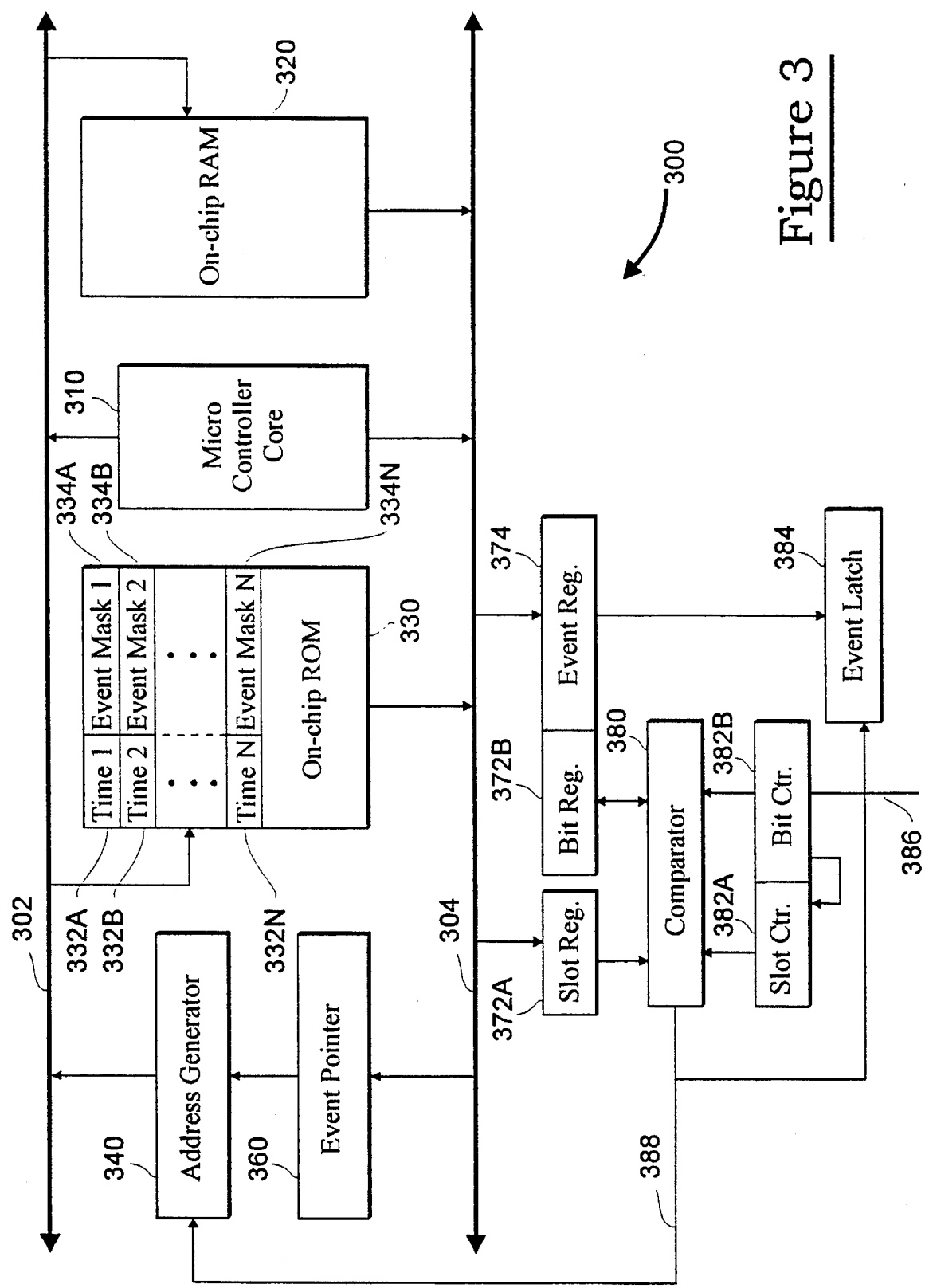
FIG. 3 is a block diagram of a TDMA communications controller for generating real-time events in a TDMA wireless communications system, according to the invention.

FIG. 3 is a block diagram showing a TDMA communications controller 300 for generating real-time events in a TDMA wireless communications system, according to the invention. The controller 300 integrates the functions of a microcontroller and a BMC into a single unit (i.e., on a single semiconductor die), while eliminating redundant and/or unnecessary circuitry. The TDMA communications controller 300 is built around a microcontroller core 310, which communicates with on-chip RAM 320, on-chip ROM 330, an address generator 340, an event pointer 360, a slot register 372A, a bit register 372B, and an event register 374 over an address bus 302 and a data bus 304.

Programmed into the on-chip ROM 330 is a table of "RF Event" entries, each entry including a bit time (e.g., Time 1 332A, Time 2 332B, ... Time N 332N) and a corresponding Event Mask (e.g., Event Mask 1 334A, Event Mask 2 334B, ... Event Mask N 334N). These event masks (334'x') and corresponding bit times (332'x') define which signals are to be changed at what bit times during a time slot. Each bit in each event mask corresponds to a control signal for which an event can be triggered at corresponding specified bit-time. Since this table is stored in the same on-chip ROM 330 as the microcontroller's program (not illustrated), a system developer can include the table entries with the microcontroller's program as an appended data structure. For example, if the microcontroller's program is written in the "C" programming language, a data structure of the type shown below can be employed. (The exact layout of the data structure is implementation dependent. The structure (sample code segment) shown below is intended only as an example.)

```
typedef struct {
    unsigned int time;
    unsigned int event;
    } Time_Event; /* a type definition for RF table
entries */
Time_Event event_table[] = {
    130, 0x5a01, /* events at bit-time 130 */
    190, 0x5a10, /* two bits change at bit-time 190 */
    302, 0x0000, /* all bits cleared at bit-time 302 */
    };
```

The Event Pointer 360 is programmed by the microcontroller 310 to point to a first ROM table entry corresponding to a set of events to occur in a given time slot.

The address Generator 340 is loaded with the value contained in the Event Pointer prior to the beginning of a frame. Then, by Direct Memory Access (DMA), the address generator 340 transfers successive ROM table entries into the bit register 372B and the event register 374. For each such transfer, a bit time (e.g., 332'x') is stored into the bit register 372B and the corresponding event mask (e.g., 334'x') is stored into the event register 374. After each DMA transfer, the event register 374 contains next-state values to be applied to a set of control signals at the bit time specified in the bit register 372B.

Prior to enabling event generation, the microcontroller 310 programs the slot register 372A with a time slot number in which event generation is to occur.

Communication timekeeping is accomplished by a slot counter (Slot Ctr.) 382A and bit counter (Bit Ctr.) 382B. The bit counter 382B is clocked by a bit clock (see line 386) to count bit times within a time slot. As a last bit time in each time slot within a frame passes, the slot counter 382A is incremented. The bit counter 382B and slot counter 382A are initialized at the beginning of each frame so that their counts are synchronized to frame timing.

A comparator 380 compares the values stored in the slot register 372A and the bit register 372B with the current values of the slot counter 382A and the bit counter 382B, respectively. When a match is found, a "match" signal is asserted (on a line 388).

An event latch 384 is loaded with the value inside the Event Register each time the "match" signal is asserted (388). Outputs from the event latch 384 correspond directly to the control signals for which real-time events are generated.

During the development of TDMA controller software, a programmer would prepare a list of events that are to occur during the various types of slots. These slots may be "Transmit" slots, "Receive" slots, "Energy Measurement" slots, etc, Each type of slot has its own event list (set of ROM table entries).

For the TDMA controller 300 to generate real-time events for a particular type of time slot activity during a specific time slot within a frame, the microcontroller 310 loads the address of an appropriate event list into the event pointer 360, loads the time slot number into the slot register 372A, and enables real-time event generation. From this point on, the micro-controller is not involved in event generation.

The address generator 340 is automatically loaded with the value stored in the event pointer 360 when event generation is enabled, and it accesses the ROM 330 to transfer a time value (332'x') associated with the next ROM table entry into the bit register 372B, and the associated event mask (334'x') value into the event register 374. As described above, when the comparator 380 detects a slot time and bit time match, the event mask value in the event register 374 is transferred to the event latch 384, producing control signal state change(s); and the address generator 340 transfers the next time value/event mask value into the bit register 372B and the event register 374 and increments an internal address value (initially received from the event pointer 360) to "point" to the next ROM table entry. This cycle repeats until all ROM table entries for the time slot have been acted upon.

In combining BMC and microcontroller functions onto a single chip, the present inventive technique does not simply integrate the two existing functions—micro-controller and BMC. Instead, the inventive technique takes advantage of this functional integration by sharing on-chip ROM resources between the microcontroller and the event generator. This sharing makes it possible to create the event lists using ordinary software development tools, as described hereinabove. The event list is seen by the micro-controller as a block of data—making it much simpler to incorporate into a design than an often arcane, "foreign" instruction set to be transferred to a separate sequencer.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected.

For example, any counter arrangement which permits programming activation of an event at a specific slot and bit time (e.g., a countdown register with a carry output) may be substituted for the slot-register/bit register/comparator/slot counter/bit counter arrangement.

For example, the address generator/event pointer as described hereinabove is a specific case of a more general class of automatic data transfer mechanisms, and any suitable data transfer mechanism which accomplishes substantially the same function may be substituted therefor.

For example, although part of the space savings of the chip-space savings achieved by the present inventive technique is achieved by using ROM memory for storing both the microcontroller's operating program and the ROM-table data, it is within the spirit and scope of the present invention to substitute any type of memory for the on-chip ROM (e.g., 330 of FIG. 3), provided that it is shared between the microcontroller core and the event generation circuitry in the manner described hereinabove.

What is claimed is:

1. A single-chip TDMA communications controller for generating real-time events in a TDMA wireless digital communications system, comprising:

a microcontroller core;

on-chip memory for storing a program for the microcontroller core and for storing an event list, said event list including one or more event list entries, each event list entry including a bit-time specifier and an event mask;

a counter providing current slot count and current bit-time count, said counter synchronized to a TDMA frame rate;

automatic data transfer circuitry for accessing event list entries in the on-chip memory;

comparison circuitry for providing a match signal when the current slot count bit-time count match a pre-specified slot number and the bit-time specifier in an event list entry accessed by the automatic data transfer circuitry; and an event latch, responsive to the match signal, for receiving the event mask of the event list entry accessed by the automatic data transfer circuitry.

2. A single-chip TDMA communications controller, according to claim 1, further comprising:

a slot register for providing the pre-specified slot number.

3. A single-chip TDMA communications controller, according to claim 1, further comprising:

an event pointer register for providing a pointer value.

4. A single-chip TDMA communications controller, according to claim 3, wherein:

said automatic data transfer circuitry uses said pointer value as an address of a first event list entry in the on-chip memory to be accessed, incrementing and using said address to access a next event list entry in response to the match signal.

5. A single-chip TDMA communications controller, according to claim 4, further comprising:

a slot register for providing the pre-specified slot number.

6. A single-chip TDMA communications controller, according to claim 1, wherein:

the on-chip memory is ROM (Read Only Memory).

7. A single-chip TDMA communications controller, according to claim 1, further comprising:

outputs from the event latch providing control signals for which real-time events occur each time the event latch receives an event mask.

8. A method of generating real-time events in a TDMA wireless digital communications system, comprising:

providing a microcontroller core on a semiconductor chip;

providing an on-chip memory on the semiconductor chip;

storing a microcontroller program in the on-chip memory;

storing an event list in the on-chip memory, said event list including one or more event list entries, each event list entry including a bit-time specifier and an event mask;

providing a counter, said counter providing current slot count and current bit-time count, said counter synchronized to a TDMA frame rate;

accessing an event list entry in the on-chip memory;

providing a match signal when the current slot count bit-time count match a pre-specified slot number and the bit-time specifier in an event list entry accessed by the automatic data transfer circuitry; and latching the event mask of the accessed event list entry.

9. A method, according to claim 8, further comprising:

providing the pre-specified slot number in a slot register.

10. A method, according to claim 8, further comprising:

providing a pointer value in an event pointer register.

11. A method, according to claim 10, further comprising:

using said pointer value as an address of a first event list entry in the on-chip memory to be accessed, and incrementing and using said address to access a next event list entry in response to the match signal.

12. A method, according to claim 11, further comprising:

providing the pre-specified slot number in a slot register.

13. A method, according to claim 8, wherein:

the on-chip memory is ROM (Read Only Memory).

14. A method, according to claim 8, further comprising:

providing control signals corresponding to bit values in the latched event mask.

15. A communication system including a TDMA communications controller, comprising:

a microcontroller core, an address bus and a data bus;

random access memory connected to the address bus and the data bus;

an address generator connected to the address bus;

an event pointer connected to the data bus and to the address generator;

a slot register connected to the data bus;

a bit register connected to the data bus;

an event register connected to the data bus; and read only memory connected to the address bus and the data bus, said read only memory containing a program for operating the microcontroller core and containing event entries, said event entries comprising bit times and event masks defining signals which are to be communicated via the communication system.

16. A communication system, according to claim 15, wherein:

the communication system is a wireless communication system.

17. A communication system, according to claim 15, wherein:

the microcontroller core, the address bus, the data bus, random access memory, the address generator, the event pointer, the slot register, the bit register, the event register, and the read only memory are all implemented on a single semiconductor die.

* * * * *